United States Patent [19]

Kishida et al.

[11] Patent Number: 4,558,099

[45] Date of Patent: Dec. 10, 1985

[54] THERMOPLASTIC RESIN HAVING EXCELLENT IMPACT RESISTANCE AND HEAT RESISTANCE

[75] Inventors: Kazuo Kishida; Naoki Yamamoto, both of Hiroshima; Yasumasa Sato, Tokorozawa, all of Japan

[73] Assignee: Mitsubishi Rayon Co., Ltd., Tokyo, Japan

[21] Appl. No.: 675,232

[22] Filed: Nov. 27, 1984

[30] Foreign Application Priority Data

Nov. 30, 1983 [JP] Japan .................................. 58-225596
Dec. 1, 1983 [JP] Japan .................................. 58-227536

[51] Int. Cl.$^4$ ........................................... C08F 265/02
[52] U.S. Cl. .................................................... 525/301
[58] Field of Search .................................. 525/78, 301

[56] References Cited

U.S. PATENT DOCUMENTS 4,331,784  5/1982  Ishibashi .............................. 525/301

Primary Examiner—Paul R. Michl
Attorney, Agent, or Firm—Oblon, Fisher, Spivak, McClelland & Maier

[57] ABSTRACT

A thermoplastic resin having excellent impact resistance and heat resistance obtainable by polymerizing 93 to 30 parts by weight of a monomer mixture comprising 20 to 90% by weight of at least one α-alkylaromatic vinyl monomer, 10 to 40% by weight of at least one vinyl cyanide monomer and 0 to 60% by weight of at least one vinyl monomer copolymerizable therewith (100% by weight in total) in the presence of 7 to 70 parts by weight (in terms of solid) of a rubber latex of a large particle size having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one vinyl monomer copolymerizable therewith (100% by weight in total) to 100 parts by weight (in terms of solid) of a rubber (A) latex of a small particle size having a pH of 7 or higher obtained from 100 to 50% by weight of 1,3-butadiene and 0 to 50% by weight of a monomer having $CH_2=C<$ group and copolymerizable therewith (100% by weight in total).

10 Claims, No Drawings

THERMOPLASTIC RESIN HAVING EXCELLENT IMPACT RESISTANCE AND HEAT RESISTANCE

TECHNICAL FIELD

This invention relates to a novel thermoplastic resin having excellent impact resistance and heat resistance.

PRIOR ART

As thermoplastic resins having excellent impact resistance, there are widely used at present rubber-modified thermoplastic resins, of which ABS resins and high impact polystyrenes are typical representatives. However, the use thereof at relatively high temperatures is subjected to restrictions due to their poor heat resistance. As a result, there have been proposed various methods for improving the heat resistance of ABS resins. For example, there is disclosed in Japanese Patent Publication Nos. 18194/60 and 33661/70 and other publications that compositions having high heat resistance can be obtained by blending a copolymer formed of α-methylstyrene and acrylonitrile with ABS resin or by introducing α-methylstyrene into ABS resin polymer. However, when an α-alkylaromatic vinyl monomer is introduced as a unit of graft polymer or blend polymer, though the heat resistance of the resultant resin is improved with the increase in the amount of the introduced monomer, the impact resistance of the resin is deteriorated markedly. So that it has been difficult to obtain a rubber-modified thermoplastic resin having simultaneously excellent impact strength and heat resistance by such means.

The present inventors made extensive studies to solve the problem mentioned above. As a result, it has been found out that a thermoplastic resin which is excellent in both impact resistance and heat resistance can be obtained by grafting an α-alkylaromatic vinyl monomer as the graft resin component to a diene rubber having specified particle diameter which has been prepared by a specified method, to form a rubber-modified thermoplastic resin. This invention has been attained on the basis of above finding.

OBJECT OF THE INVENTION

The object of this invention is to provide a thermoplastic resin having a greatly improved balance between impact resistance and heat resistance by polymerizing an α-alkylaromatic vinyl monomer and a vinyl cyanide monomer in the presence of a rubber of a large particle diameter obtained by agglomerating the particles of a diene rubber latex obtained by a conventional emulsion polymerization by adding thereto a copolymer latex obtained principally from an unsaturated acid monomer and an alkyl acrylate.

CONSTRUCTION OF THE INVENTION

This invention relates to a thermoplastic resin having excellent impact resistance and heat resistance obtainable by polymerizing 93 to 30 parts by weight of a monomer mixture comprising 20 to 90% by weight of at least one α-alkylaromatic vinyl monomer, 10 to 40% by weight of at least one vinyl cyanide monomer and 0 to 60% by weight of at least one vinyl monomer copolymerizable therewith (100% by weight in total) in the presence of 7 to 70 parts by weight (in terms of solid) of a rubber latex of a large particle size having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one monovinyl monomer copolymerizable therewith (100% by weight in total) to 100 parts by weight (in terms of solid) of a rubber (A) latex of a small particle size having a pH of 7 or above obtained from 100 to 50% by weight of 1,3-butadiene and 0 to 50% by weight of other copolymerizable monomers having $CH_2\!\!=\!\!C\!<$ group (100% by weight in total).

The rubber components (A) used in this invention are those which are constituted of 100 to 50% by weight of 1,3-butadiene and 0 to 50% by weight of other copolymerizable monomers having $CH_2\!\!=\!\!C\!<$ group (100% by weight in total) and are 1,3-polybutadiene or copolymers derived from 50% or more of 1,3-butadiene, which include for example, butadiene-aromatic vinyl compound copolymers such as butadiene-styrene copolymer or butadiene-vinyl-toluene copolymer, butadiene-acrylonitrile copolymer, butadiene-methacrylonitrile copolymer, butadiene-alkyl acrylate copolymers such as butadiene-methyl acrylate, butadiene-ethyl acrylate, butadiene-butyl acrylate, and butadiene-2-ethylhexyl acrylate copolymer and butadiene-alkyl methacrylate copolymers such as butadiene-methyl methacrylate and butadiene-ethyl methacrylate copolymer, and include further terpolymers derived from 50% or more of butadiene. These polymers can be easily obtained by commonly known methods of emulsion polymerization. There is no particular restriction as to catalysts and emulsifiers to be used. The polymers have a particle diameter of 0.04 to 0.2 μm.

The acid-group containing copolymer (B) latex in this invention is used to agglomerate the particle of the above-mentioned rubber (A) latex.

It is indispensable condition that the acid-group containing copolymer (B) comprises an acid-group containing monomer and an alkyl acrylate as the constituents thereof. Examples of the acid-group containing monomer include acrylic acid, methacrylic acid, itaconic acid and crotonic acid. There may also be mentioned cinnamic acid, maleic anhydride, butene tricarboxylic acid and so forth, but these are not useful in practice because copolymers prepared by using the monomers exhibit poor particle-agglomerating ability.

As the alkyl acrylate, there is selected at least one alkyl acrylate having 1 to 12 carbon atoms in the alkyl group.

When other monomers such as methacrylate, styrene or acrylonitrile are used in place of alkyl acrylates, no particle-agglomerating effect is observable at all. It is possible, however, to replace half the amount of alkyl acrylate or less with other monomers.

The above-mentioned acid-group containing monomer is used in a proportion of 3 to 30% by weight of the monomers constituting the acid-group containing copolymer (B). At a proportion below 3% by weight the agglomerating ability of the copolyner is too low, whereas at a proportion over 30% by weight, the agglomerating power is too strong and it tends to cause the formation of too large particles of over 1 μm.

The optimum constituting proportion of the acid-group containing monomer varies depending on the degree of hydrophilicity of alkyl acrylates to be used. When the alkyl acrylate has a high hydrophilicity, the agglomerating effect appears in a range where the proportion of the acid-group containing monomer is small, whereas at a high proportion of the monomer unfavorable destruction of the latex occurs. In contrast, when the alkyl acrylate has a low hydrophilicity the agglomerating effect is small at a range where the proportion of the acid-group containing monomer is small and the effect becomes apparent only in case that the proportion of the acid-group containing monomer has exceeded a certain value. For example, in the case of methyl acrylate or ethyl acrylate, which is an alkyl acrylate of high hydrophilicity, the best result can be obtained when the proportion of the acid-group containing monomer is 5 to 10% by weight, whereas in the case of butyl acrylate or 2-ethylhexyl acrylate, which is an alkyl acrylate of low hydrophilicity having 4 or more carbon atoms in the alkyl group, the best result can be obtained when the proportion of the acid-group containing monomer is 13 to 20% by weight. It is to be noted here that the use of a highly hydrophilic alkyl acrylate has drawback in that even when the proportion of the acid-group containing monomer is 5 to 10% by weight the system is liable to become unstable and resultantly tends to form cullets (coarse particles), whereas the use of a hydrophobic alkyl acrylate mentioned above causes no instability of the system and in many cases gives uniform, agglomerated particles.

As to preferred examples of the acid-group containing copolymer (B), mention may be made of n-butyl acrylate-methacrylic acid copolymer.

In synthesizing the acid-group containing copolymer (B) latex, the acid-group containing monomer, alkyl acrylate and copolymerizable monovinyl monomer may be added all at once, or they may be added in portions or continuously. In portionwise or continuous addition, further, the composition of the mixtures of above-mentioned monomers may be changed stepwise in the course of polymerization. For example, a latex having a double layer structure, obtained by first polymerizing a portion of a monomer group consisting of acid-group containing monomer, alkyl acrylate and copolymerizable monovinyl monomer, which portion amounts to 5 to 90% by weight of the total amount of the monomer group and contains no said acid-group containing monomer, and then polymerizing the remaining 95 to 10% by weight portion of the monomer group which contains said acid-group containing monomer, has also an excellent agglomerating ability and can be used effectively.

The acid-group containing copolymer (B) is used preferably in the form of a latex, and the agglomerating ability of the copolymer is markedly affected by the particle size of the latex. The average particle diameter is preferably in the range of 0.05 to 0.2 μm. When the average diameter is smaller than 0.05 μm the agglomerating ability of the copolymer is markedly decreased, whereas when it is larger than 0.2 μm the rubber particle diameter after agglomerating treatment becomes too large, so that the system becomes unstable and is liable to coagulate when, for example, the system is subsequently subjected to graft polymerization.

The amount of the acid-group containing copolymer (B) latex to be added is 0.1 to 5 parts by weight (in terms of solid) per 100 parts by weight (in terms of solid) of the base rubber (A) latex and is preferably 0.5 to 3 parts by weight.

In adding the acid-group containing copolymer (B) latex to the base rubber (A) latex, there may also be added 0.04 to 4 parts by weight, particularly 0.1 to 1 part by weight of an inorganic electrolyte, preferably an inorganic salt, particularly a neutral inorganic salt, relative to 100 parts by weight (in terms of solid) of the base rubber (A) latex. Thereby, the particle diameter of the base rubber is agglomerated very effectively and stably. Commonly known inorganic salts such as potassium chloride, sodium chloride and sodium sulfate can be used as the inorganic electrolyte.

It is also possible to add the inorganic electrolyte in advance at the time of the preparation of the base rubber (A) latex. It gives an effect equivalent to that of the addition of the electrolyte at the time of agglomerating treatment.

In practicing the agglomerating treatment of this invention, it is necessary to keep the pH of the base rubber (A) latex at 7 or higher. When the pH value is on the acid side, only a low agglomerating efficiency is exhibited by addition of the acid-group containing copolymer (B) latex and it is difficult to prepare advantageously a thermoplastic resin aimed at by this invention.

The adjustment of pH of the base rubber (A) latex to 7 or above may be conducted either during the polymerization of the base rubber or separately before the agglomerating treatment.

The objective thermoplastic resin can be obtained by polymerizing 93 to 30 parts by weight of a monomer mixture comprising 20 to 90% by weight, preferably 30 to 90% by weight, of at least one α-alkyl-aromatic vinyl monomer, 10 to 40% by weight of at least one vinyl cyanide monomer and 0 to 60% by weight of at least one vinyl monomer copolymerizable therewith (100% by weight in total) in the presence of 7 to 70 parts by weight (in terms of solid) of the rubber latex having a large particle size which has been subjected to the agglomerating treatment as mentioned above.

Examples of α-alkylaromatic vinyl monomers in this invention include α-methylstyrene, α-ethylstyrene, or α-methylstyrene which is ring-substituted with halogens or alkyls. They may be used either alone or in a combination of two or more thereof. A preferable one is α-methylstyrene. The vinyl cyanide monomers include, for example, acrylonitrile, methacrylonitrile and ethacrylonitrile and may be used either alone or in a combination of two or more thereof. Preferred one is acrylonitrile. The vinyl monomers copolymerizable therewith include, for example, styrene, styrene which is ring-substituted with halogens, styrene which is ring-substituted with alkyls, alkyl methacrylate such as methyl methacrylate or ethyl methacrylate and alkyl acrylate such as methyl acrylate, ethyl acrylate or butyl acrylate. They may be used either along or in a combination of two or more thereof.

Commonly known emulsifiers and catalysts are used in the above emulsion graft polymerization with no particular restriction imposed as to the kind and amount to be added thereof.

When the content of base rubber is less than 7 parts by weight, the resultant resin has poor impact resistance and has no practical value. When the content of base rubber exceeds 70 parts by weight, the fluidity and processability of the resultant resin become poor; which is unfavorable. Preferred content of the rubber is 10 to 60 parts by weight.

In graft-polymerizing a monomer onto the rubber of agglomerated particles, the monomer to be grafted may be added all at once, or in portions, or continuously. The monomers may also be graft-polymerized separately and stepwise. For example, in polymerizing a monomer group consisting of α-alkylaromatic vinyl monomer, vinyl cyanide monomer and vinyl monomer copolymerizable therewith in the presence of rubber latex of a large particle size, a process is also effective which comprises first polymerizing a portion of the monomer group containing no α-alkylaromatic vinyl monomer and then polymerizing the remaining portion of the monomer group containing α-alkylaromatic vinyl monomer.

The thus obtained graft or graft-blend polymer may be incorporated with conventional antioxidants, lubricants, colorants, fillers and other additives.

Further, a resin composition having good impact resistance and heat resistance can be obtained by blending a resin containing no rubber with the above-mentioned graft polymer. Examples of the resin containing no rubber include polystyrene, styrene-maleic anhydride copolymer, α-methylstyrene-maleic anhydride copolymer, polymethyl methacrylate, methyl methacrylate-α-methylstyrene-acrylonitrile copolymer, styrene-methyl methacrylate copolymer, acrylonitrile-styrene copolymer, α-methylstyrene-acrylonitrile copolymer, styrene-N-phenylmaleimide copolymer, styrene-N-alkylmaleimide copolymer, α-methylstyrene-N-phenylmaleimide copolymer, α-methylstyrene-N-alkylmaleimide copolymer, polyvinyl chloride and polycarbonate.

EXAMPLE

This invention will be explained in more detail below with reference to Examples.

The terms "part" and "%" as used in the following Examples refer to "part by weight" and "% by weight", respectively.

The Izod impact strength and the Vicat softening temperature were determined according to ASTM D-256 and ISO R-306, respectively.

EXAMPLES 1 TO 5

| Synthesis of base rubber (A-1) | |
|---|---|
| 1,3-Butadiene | 66 parts |
| Butyl acrylate | 9 parts |
| Styrene | 25 parts |
| Diisopropylbenzene hydroperoxide | 0.2 part |
| Potassium oleate | 1.0 part |
| Potassium salt of disproportionated rosin acid | 1.0 part |
| Sodium pyrophosphate | 0.5 part |
| Ferrous sulfate | 0.005 part |
| Dextrose | 0.3 part |
| Anhydrous sodium sulfate | 0.3 part |
| Water | 200 parts |

Polymerization was carried out in a 100 liters autoclave at 50° C. by using the above-mentioned composition. The polymerization was nearly completed in 9 hours, yielding a rubber latex of conversion rate of 97%, particle diameter of 0.08 μm and pH of 9.0.

| Synthesis of acid-group containing copolymer (B-1) latex for agglomerating treatment | |
|---|---|
| n-Butyl acrylate | 85 parts |
| Methacrylic acid | 15 parts |
| Potassium oleate | 2 parts |
| Sodium dioctylsulfosuccinate | 1 part |
| Cumene hydroperoxide | 0.4 part |
| Formaldehyde sodium sulfoxylate | 0.3 part |
| Water | 200 parts |

Polymerization was carried out by using the above composition in another polymerization apparatus at 70° C. for 4 hours. A latex having an average particle diameter of 0.08 μm was obtained; conversion rate: 98%.

To 100 parts (in terms of solid) of the base rubber (A-1) latex, was added 2.0 parts (in terms of solid) of the above-mentioned acid-group containing copolymer (B-1) latex with stirring; the stirring was further continued for 30 minutes to obtain an agglomerated rubber latex having an average particle diameter of 0.28 μm. Graft polymerization was carried out by using the agglomerated rubber latex and according to the recipe shown in Table 1 below to synthesize a graft polymer. Polymerization was conducted at 70° C. for 4 hours in each Example.

TABLE 1

| Synthesis of graft polymers (G-1 to G-5) | | Example 1 G-1 | Example 2 G-2 | Example 3 G-3 | Example 4 G-4 | Example 5 G-5 |
|---|---|---|---|---|---|---|
| Agglomerated rubber (as solid) | (part) | 10 | 15 | 20 | 25 | 30 |
| Graft manner | | | | | | |
| α-Methylstyrene | (part) | 54 | 51 | 48 | 45 | 42 |
| Acrylonitrile | (part) | 27 | 25.5 | 24 | 22.5 | 21 |
| Styrene | (part) | 9 | 8.5 | 8 | 7.5 | 7 |
| Cumene hydroperoxide | | 0.6 | 0.6 | 0.6 | 0.6 | 0.6 |
| Potassium salt of disproportionated rosin acid | (part) | 2.0 | 2.0 | 2.0 | 2.0 | 2.0 |
| Sodium pyrophosphate | (part) | 0.2 | 0.2 | 0.2 | 0.2 | 0.2 |
| Ferrous sulfate | (part) | 0.01 | 0.01 | 0.01 | 0.01 | 0.01 |
| Dextrose | (part) | 0.35 | 0.35 | 0.35 | 0.35 | 0.35 |
| Water | (part) | 200 | 200 | 200 | 200 | 200 |

The polymer latex obtained above was incorporated with 2 parts of butylated hydroxytoluene and 0.5 part of dilauryl thiopropionate as antioxidants, then coagulated with 5% aqueous sulfuric acid, washed and dried to obtain a white powder. The powder was incorporated with 0.1 part of a phosphite-type stabilizer, blended in a Henschel mixer at 3000 r.p.m for 5 minutes and then extruded at a cylinder temperature of 230° C. into pellets. The pellets were molded in a screw-type injection molding machine (cylinder temperature: 220° C., mold temperature: 60° C.) to prepare test pieces for determination of the Izod impact strength with notch and the Vicat softening temperature. The results of determination were found to be good in both Izod impact strength and Vicat softening temperature.

The results, which are shown in Table 2, reveal that the resins obtained in Examples exhibit a more excellent balance between impact strength and heat resistance as compared with those of Comparative Examples described below.

COMPARATIVE EXAMPLES 1 TO 5

Synthesis of base rubber (A-2)
A composition comprising:

| | |
|---|---|
| 1,3-Butadiene | 66 parts |
| Butyl acrylate | 9 parts |
| Styrene | 25 parts |
| Sodium persulfate | 0.3 part |
| Dodecyl mercaptan | 0.4 part |
| Potassium oleate | 0.5 part |
| Potassium salt of disproportionated rosin acid | 0.5 part |
| Water | 50 parts | was charged into a 100 liters autoclave. Polymerization was initiated at 60° C. with stirring at 80 r.p.m. When the conversion in polymerization had reached 30%, the number of revolutions in stirring was elevated to 140 r.p.m. When the conversion in polymerization had exceeded 50%, the number of revolutions in stirring was lowered to 100 r.p.m. and a mixture of the composition:

| | |
|---|---|
| Potassium oleate | 1.0 part |
| Potassium salt of disproportionated rosin acid | 1.0 part |
| Water | 15 parts | was added intermittently to the polymerization system. Polymerization was nearly completed in 45 hours, yielding a rubber latex of conversion in polymerization of 97.5%, particle diameter of 0.28 μm and pH of 8.9.

Graft polymers were obtained in the same manner as in Examples 1 to 5 except that the above-mentioned rubber latex (A-2) was used in place of the agglomerated rubber latex used in Examples 1 to 5. Subsequently, test pieces were prepared and their Izod impact strength and Vicat softening temperature were determined in the same manner as in Examples 1 to 5. The results of the determination are shown together in Table 2.

TABLE 2

| | Constitution of graft polymer | | | | Izod impact strength (kg·cm/cm) | Vicat softening temperature (°C.) |
|---|---|---|---|---|---|---|
| | Rubber (part) | α-Methylstyrene (part) | Acrylonitrile (part) | Styrene (part) | | |
| Example 1 | 10 | 54 | 27 | 9 | 12.3 | 115 |
| Example 2 | 15 | 51 | 25.5 | 8.5 | 25.7 | 115 |
| Example 3 | 20 | 48 | 24 | 8 | 33.0 | 113 |
| Example 4 | 25 | 45 | 22.5 | 7.5 | 37.0 | 112 |
| Example 5 | 30 | 42 | 21 | 7 | 40.5 | 111 |
| Comparative Example 1 | 10 | 54 | 27 | 9 | 6.3 | 115 |
| Comparative Example 2 | 15 | 51 | 25.5 | 8.5 | 12.3 | 114 |
| Comparative Example 3 | 20 | 48 | 24 | 8 | 18.7 | 113 |
| Comparative Example 4 | 25 | 45 | 22.5 | 7.5 | 24.0 | 112 |
| Comparative Example 5 | 30 | 42 | 21 | 7 | 28.6 | 111 |

EXAMPLES 6 TO 10

Graft polymerizations were conducted by using an agglomerated rubber latex obtained in the same manner as in Example 1 and according to the recipes indicated in Table 3 below at 70° C. for 4 hours to synthesize graft polymers.

TABLE 3

| Synthesis of graft polymer (G-6 to G-10) | | Example 6 G-6 | Example 7 G-7 | Example 8 G-8 | Example 9 G-9 | Example 10 G-10 |
|---|---|---|---|---|---|---|
| Agglomerated rubber (as solid) | (part) | 15 | 15 | 15 | 15 | 20 |
| Graft monomer | | | | | | |
| α-Methylstyrene | (part) | 65 | 60 | 40 | 26 | 40 |
| Acrylonitrile | (part) | 20 | 25 | 25 | 25 | 16 |
| Styrene | (part) | — | — | 20 | 34 | — |
| Methyl methacrylate | (part) | — | — | — | — | 24 |
| Cumene hydroperoxide | (part) | 0.6 | 0.6 | 0.6 | 0.6 | 0.6 |
| Potassium salt of disproportionated rosin acid | (part) | 2.0 | 2.0 | 2.0 | 2.0 | 2.0 |
| Sodium pyrophosphate | (part) | 0.2 | 0.2 | 0.2 | 0.2 | 0.2 |
| Ferrous sulfate | (part) | 0.01 | 0.01 | 0.01 | 0.01 | 0.01 |
| Dextrose | (part) | 0.35 | 0.35 | 0.35 | 0.35 | 0.35 |
| Water | (part) | 200 | 200 | 200 | 200 | 200 |

Subsequently, test pieces were prepared and evaluated in the same manner as in Example 1 and were found to have excellently balanced impact strength and heat resistance. The results are shown in Table 4.

EXAMPLES 11 TO 13

| Synthesis of base rubber (A-3) | |
|---|---|
| 1,3-Butadiene | 100 parts |
| Diisopropylbenzene hydroperoxide | 0.2 part |
| t-Dodecyl mercaptan | 0.5 part |
| Potassium oleate | 1.0 part |
| Potassium salt of disproportionated rosin acid | 1.0 part |
| Sodium pyrophosphate | 0.5 part |
| Ferrous sulfate | 0.005 part |
| Dextrose | 0.3 part |
| Anhydrous sodium sulfate | 0.4 part |
| Water | 200 parts |

Polymerization was carried out in a 100 liters autoclave at 50° C. by using the above composition. The polymerization was nearly completed in 9 hours, yielding a rubber latex of conversion rate of 96%, particle diameter of 0.08 μm and pH of 8.8.

To 100 parts (in terms of solid) of the rubber (A-3) latex obtained above, was added 2.0 parts (in terms of solid) of the acid-group containing copolymer (B-1) for agglomerating treatment used in Example 1 with stirring; the stirring was further continued for 30 minutes to obtain an agglomerated rubber latex having an average particle diameter of 0.30 μm. Graft polymers (G-11 to 13) were then prepared in the same manner as in Examples 6 to 8 except that the rubber latex obtained above was used as the agglomerated rubber latex. Subsequently, test pieces were prepared and their impact strength and Vicat softening temperature were determined in the same manner as in Example 1. The results obtained are shown together in Table 4.

COMPARATIVE EXAMPLE 6

In the same manner as in Example 7 except that (A-2) rubber was used as the rubber, test pieces were prepared and their impact strength and Vicat softening temperature were determined. The results obtained are shown together in Table 4.

COMPARATIVE EXAMPLE 7

In the same manner as in Example 7 except that a commercially available polybutadiene rubber (FRS 2004, trade name, average particle diameter 0.3 μm, mfd. by Firestone, Inc.) was used as the rubber, test pieces were prepared and their impact strength and Vicat softening temperature were determined. The results obtained were shown together in Table 4.

TABLE 4

| | Constitution of graft polymer | | | | | | |
|---|---|---|---|---|---|---|---|
| | Rubber (part) | α-Methyl-styrene (part) | Acrylo-nitrile (part) | Styrene (part) | Methyl methacry-late (part) | Izod impact strength (kg · cm/cm) | Vicat soften-ing tempera-ture (°C.) |
| Example 6 | 15 | 65 | 20 | — | — | 22.9 | 123 |
| Example 7 | 15 | 60 | 25 | — | — | 23.7 | 119 |
| Example 8 | 15 | 40 | 25 | 20 | — | 28.5 | 108 |
| Example 9 | 15 | 26 | 25 | 34 | — | 31.0 | 97 |
| Example 10 | 20 | 40 | 16 | — | 24 | 27.2 | 109 |
| Example 11 | 15 | 65 | 20 | — | — | 23.1 | 122 |
| Example 12 | 15 | 60 | 25 | — | — | 24.2 | 118 |
| Example 13 | 15 | 40 | 25 | 20 | — | 29.1 | 108 |
| Comparative Example 6 | 15 | 60 | 25 | — | — | 9.8 | 118 |
| Comparative Example 7 | 15 | 60 | 25 | — | — | 10.4 | 118 |

EXAMPLES 14 TO 17

| Preparation of acid-group containing copolymer (B-2) latex for agglomerating treatment | |
|---|---|
| n-Butyl acrylate | 25 parts |
| Potassium oleate | 2 parts |
| Sodium dioctylsulfosuccinate | 1 part |
| Cumene hydroperoxide | 0.1 part |
| Formaldehyde sodium sulfoxylate | 0.3 part |
| Water | 200 parts |

A mixture having above composition was polymerized at 70° C. for 1.5 hours. Subsequently, a mixture having a composition:

| n-Butyl acrylate | 60 parts |
|---|---|
| Methacrylic acid | 15 parts |
| Cumene hydroperoxide | 0.3 part | was added dropwise to the above polymerized mixture at 70° C. over a period of 1 hour. Stirring was continued for further 1 hour to obtain a copolymer latex of conversion rate of 98% and average particle diameter of 0.08 μm.

To 100 parts (in terms of solid) of the base rubber (A-1) latex used in Example 1 was added dropwise 2.0 parts (in terms of solid) of the above-mentioned acid-group containing copolymer (B-2) latex with stirring. Stirring was continued for further 30 minutes to obtain an agglomerated rubber latex of an average diameter of 0.32 μm.

Graft polymerizations were then conducted at 70° C. for 4 hours according to the recipes shown in Table 5 below by using the agglomerated rubber latex obtained above to obtain graft polymers (G-14 to G-17).

TABLE 5

| Synthesis of graft polymers (G-14 to G-17) | | | | | |
|---|---|---|---|---|---|
| | | Example 14 G-14 | Example 15 G-15 | Example 16 G-16 | Example 17 G-17 |
| Agglomerated rubber (as solid) | (part) | 15 | 15 | 15 | 15 |

TABLE 5-continued

| Synthesis of graft polymers (G-14 to G-17) | | Example 14 G-14 | Example 15 G-15 | Example 16 G-16 | Example 17 G-17 |
| --- | --- | --- | --- | --- | --- |
| Graft monomer | | | | | |
| α-Methylstyrene | (part) | 68 | 65 | 60 | 60 |
| Acrylonitrile | (part) | 17 | 20 | 20 | 20 |
| Styrene | (part) | — | — | 5 | — |
| Methyl methacrylate | (part) | — | — | — | 5 |
| Cumene hydroperoxide | (part) | 0.6 | 0.6 | 0.6 | 0.6 |
| Potassium salt of disproportionated rosin acid | (part) | 2.0 | 2.0 | 2.0 | 2.0 |
| Sodium pyrophosphate | (part) | 0.2 | 0.2 | 0.2 | 0.2 |
| Ferrous sulfate | (part) | 0.01 | 0.01 | 0.01 | 0.01 |
| Dextrose | (part) | 0.35 | 0.35 | 0.35 | 0.35 |
| Water | (part) | 200 | 200 | 200 | 200 |

Test pieces were prepared and evaluated in the same manner as in Example 1 and were found to have excellently balanced impact resistance and heat resistance. The results obtained are shown in Table 6.

EXAMPLES 18 TO 19

To 100 parts (in terms of solid) of the base rubber (A-3) latex used in Example 11 was added with stirring 2.0 parts of the acid-group containing copolymer (B-2) latex used in Example 14. Stirring was continued for further 30 minutes to obtain an agglomerated rubber latex having an average particle diameter of 0.34 μm.

Graft polymers (G-18, 19) were obtained under conditions similar to those in Examples 15 and 16 except that the agglomerated rubber latex obtained above was used. Subsequently, test pieces were prepared in the same manner as in Example 1 and their impact strength and Vicat softening temperature were determined. The results obtained are shown together in Table 6.

A mixture of the above composition was polymerized at 70° C. for 1 hour. Subsequently, a mixture of the following composition:

| | |
| --- | --- |
| α-Methylstyrene | 15.4 parts |
| Acrylonitrile | 6.6 parts |
| Cumene hydroperoxide | 0.15 part |
| t-Dodecyl mercaptan | 0.24 part | was added dropwise to the above polymerized mixture at 70° C. over a period of 30 minutes. Stirring was continued for further 2 hours to obtain a graft polymer (G-20).

The polymer latex obtained above was incorporated with 2 parts of butylated hydroxytoluene and 0.5 part of dilauryl thiopropionate as antioxidants, coagulated with 5% aqueous sulfuric acid, washed and dried to obtain white powders.

The pulverous polymer was blended with α-methyls-

TABLE 6

| | Constitution of graft polymer | | | | | | |
| --- | --- | --- | --- | --- | --- | --- | --- |
| | Rubber (part) | α-Methylstyrene (part) | Acrylonitrile (part) | Styrene (part) | Methyl methacrylate (part) | Izod impact strength (kg · cm/cm) | Vicat softening temperature (°C.) |
| Example 14 | 15 | 68 | 17 | — | — | 19.7 | 124 |
| Example 15 | 15 | 65 | 20 | — | — | 23.2 | 123 |
| Example 16 | 15 | 60 | 20 | 5 | — | 24.0 | 118 |
| Example 17 | 15 | 60 | 20 | — | 5 | 22.9 | 120 |
| Example 18 | 15 | 65 | 20 | — | — | 23.6 | 122 |
| Example 19 | 15 | 60 | 20 | 5 | — | 24.4 | 118 |

EXAMPLE 20

A graft polymer was obtained according to the following recipe by using the agglomerated rubber latex used in Example 11.

| Synthesis of graft polymer (G-20) | |
| --- | --- |
| Agglomerated rubber (as solid) | 50 parts |
| Styrene | 19.6 parts |
| Acrylonitrile | 8.4 parts |
| Cumene hydroperoxide | 0.15 part |
| t-Dodecyl mercaptan | 0.24 part |
| Potassium salt of disproportionated rosin acid | 1.0 part |
| Dextrose | 0.4 part |
| Ferrous sulfate | 0.01 part |
| Sodium pyrophosphate | 0.2 part |
| Water | 200 parts | tyrene-acrylonitrile copolymer (derived from 70% by weight of α-methylstyrene) in a proportion indicated in Table 7, incorporated with 0.1 part of a phosphite stabilizer and then extruded to form pellets in the same manner as in Example 1. The pellets were then injection-molded into test pieces for various determination to evaluate various physical properties. The results obtained are shown in Table 7 and reveal that the resin compositions thus obtained have excellent impact resistance and heat resistance.

TABLE 7

| | Example 20 | Example 21 | Example 22 |
| --- | --- | --- | --- |
| Graft copolymer (G-20) | 50 | 40 | 30 |
| α-Methylstyrene-acrylonitrile copolymer | 50 | 60 | 70 |
| Izod impact strength (kg · cm/cm) | 36.5 | 32.4 | 25.6 |
| Vicat softening | 111 | 113 | 116 |

TABLE 7-continued

| | Example 20 | Example 21 | Example 22 |
|---|---|---|---|
| temperature (°C.) | | | |

EFFECT OF THE INVENTION

This invention relates to a thermoplastic resin having excellent impact resistance and heat resistance, which simultaneously satisfies the requirement for both of the characteristics, and thus has an excellent effect which has been unattainable by prior art.

What is claimed is:

1. A thermoplastic resin having excellent impact resistance and heat resistance obtainable by polymerizing 93 to 30 parts by weight of a monomer mixture comprising 20 to 90% by weight of at least one α-alkylaromatic vinyl monomer, 10 to 40% by weight of at least one vinyl cyanide monomer and 0 to 60% by weight of at least one vinyl monomer copolymerizable therewith (100% by weight in total) in the presence of 7 to 70 parts by weight (in terms of solid) of a rubber latex of a large particle size having a particle diameter of at least 0.2 μm obtained by adding 0.1 to 5 parts by weight (in terms of solid) of an acid-group containing copolymer (B) latex obtained from 3 to 30% by weight of an acid-group containing monomer, 97 to 35% by weight of at least one alkyl acrylate having 1 to 12 carbon atoms in the alkyl group, and 0 to 48% by weight of at least one vinyl monomer copolymeriable therewith (100% by weight in total) to 100 parts by weight (in terms of solid) of a rubber (A) latex of a small particle size having a pH of 7 or above obtained from 100 to 50% by weight of 1,3-butadiene and 0 to 50% by weight of other copolymerizable monomers having $CH_2\!\!=\!\!C<$ group (100% by weight in total).

2. The thermoplastic resin according to claim 1 wherein the rubber (A) of a small particle size is polybutadiene.

3. The thermoplastic resin according to claim 1 wherein the average particle diameter of the rubber (A) of small particle size is 0.04 to 0.2 μm.

4. The thermoplastic resin according to claim 1 wherein the acid-group containing monomer used in synthesizing the acid-group containing copolymer (B) is at least one monomer selected from the group consisting of acrylic acid, methacrylic acid, itaconic acid and crotonic acid.

5. The thermoplastic resin according to claim 1 wherein the acid-group containing copolymer (B) is a n-butyl acrylate-methacrylic acid copolymer.

6. The thermoplastic resin according to claim 1 wherein the acid-group containing copolymer (B) is an acid-group containing copolymer obtained by first polymerizing a portion of a monomer group consisting of acid-group containing monomer, alkyl acrylate and copolymerizable monovinyl monomer, which portion amounts to 5 to 90% by weight of the total amount of the monomer group and contains no said acid-group containing monomer, and then polymerizing the remaining 95 to 10% by weight portion of the monomer group containing said acid-group containing monomer.

7. The thermoplastic resin according to claim 1 wherein 0.05 to 4 parts by weight of an inorganic electrolyte is further added to 100 parts by weight (in terms of solid) of the rubber (A) latex of small particle size.

8. The thermoplastic resin according to claim 1 wherein the α-alkylaromatic vinyl monomer is α-methylstyrene.

9. The thermoplsatic resin according to claim 1 wherein the vinyl cyanide monomer is acrylonitrile.

10. The thermoplastic resin according to claim 1 wherein, in polymerizing a monomer group comprising α-alkylaromatic vinyl monomer, vinyl cyanide monomer, and vinyl monomer copolymerizable therewith in the presence of a rubber latex of a large particle size, a portion of the monomer group containing no α-alkylaromatic vinyl monomer is first polymerized and then the remaining portion of the monomer group containing α-alkylaromatic vinyl monomer is polymerized.

* * * * *